May 4, 1948.   R. M. CANNON   2,440,846
SEED PLANTER
Filed March 13, 1944   2 Sheets-Sheet 2
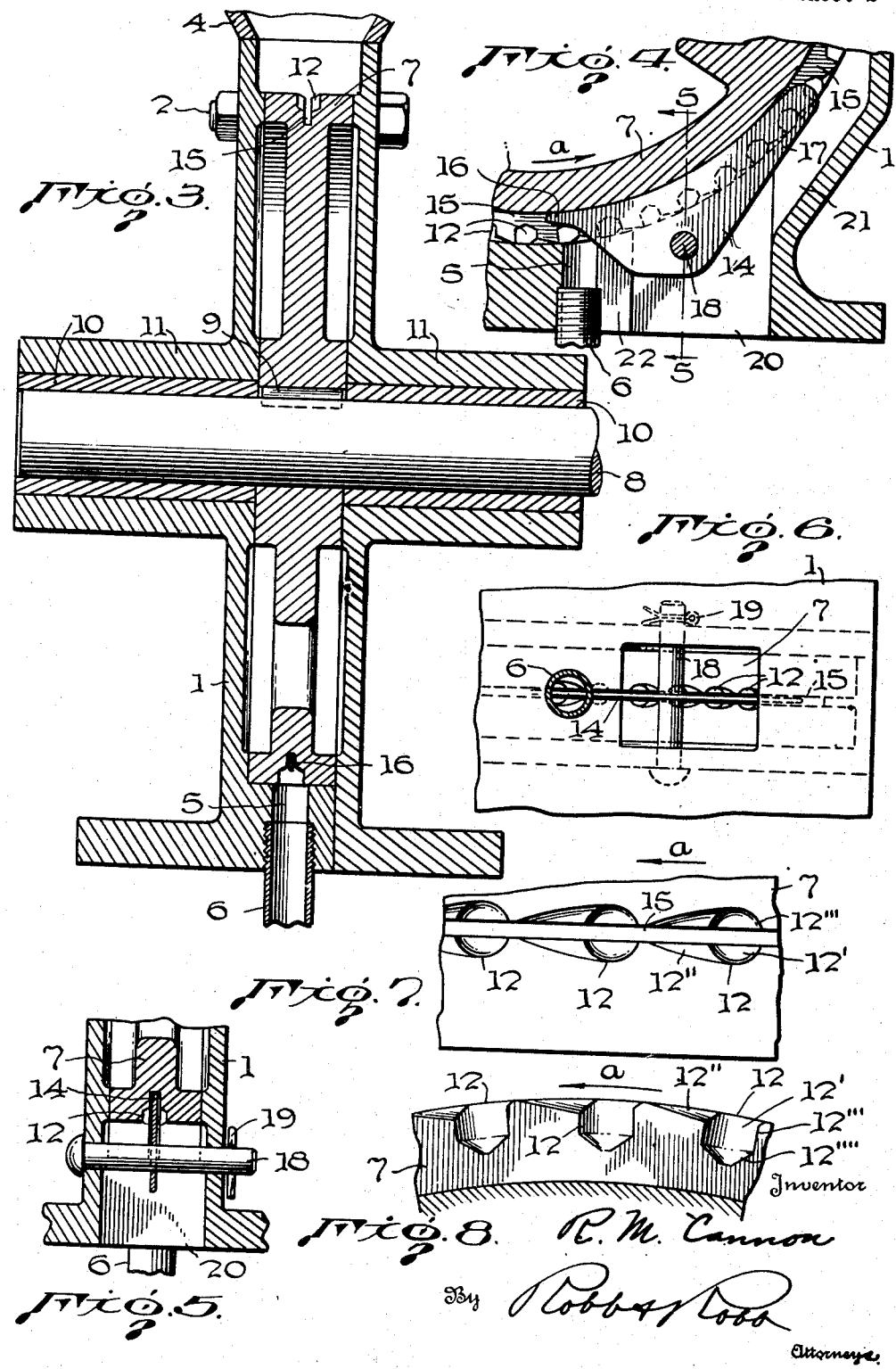

Patented May 4, 1948

2,440,846

UNITED STATES PATENT OFFICE 2,440,846

SEED PLANTER

Rowland M. Cannon, Salt Lake City, Utah, assignor to Utah-Idaho Sugar Co., Salt Lake City, Utah, a corporation of Utah Application March 13, 1944, Serial No. 526,241

2 Claims. (Cl. 222—9)

The present invention pertains to seed planters, and more especially to hopper discharging instrumentalities primarily adapted for use in connection with seed planting devices.

One of the principal objects of the invention is to provide a simple and highly efficient discharge mechanism which is so constructed as to positively insure discharge of the seeds, and to further insure uniform seed distribution along a row.

A further object of the invention is to provide a hopper discharge mechanism which includes a rotatable seed wheel or drum having seed cells or pockets of improved form in the periphery thereof. In this connection, the improvement resides in part, but not exclusively, in the elongation or relief of each seed cell or pocket at their leading sides respecting the direction of rotation of the seed wheel, the relieved portion of the cells being of progressively increasing depth, but somewhat less than the depth of the cell proper. The purpose of this feature is to facilitate the filling of the seed cells at a much higher peripheral speed of the seed wheel than has heretofore been possible in prior seed planters, most of which are dependent upon a slow drill forward speed to fill the seed cells. According to my invention, the relieved sides of the seed cells permit the seeds to start dropping into the cell well in advance of the cell proper, so that the seed may fall far enough to be retained by the rear wall of the cell as the seed wheel rotates.

Another object of the invention is to provide an improved knockout for the seeds, in cooperation with the seed wheel which is provided with an annular groove extended about the periphery of the seed wheel in alinement with the seed cells, said knockout having the form of a blade or finger member positioned to normally ride in the groove aforesaid. The shape and manner of mounting the knockout blade or finger contribute to the ease of assembly and efficiency of operation of the discharge mechanism, with minimum damage to the seed, as will hereinafter more fully appear.

A still further object of the invention is to provide an improved seed planter which requires no lubrication, and which will not be seriously affected by prolonged exposure to weather, dust, dirt, and the like.

Other and further objects and advantages of the invention will be hereinafter described and the novel features thereof defined by the appended claims.

In the drawings—

Figure 3 is a sectional view taken on the line 3—3 of Figure 1;

Figure 4 is a fragmentary vertical sectional view taken through the seed ejecting portion of the planter unit, and particularly showing the seed knockout blade or finger as assembled in the housing of the planter unit in operative relation to the seed wheel and discharge spout, said knockout blade being shown in elevation;

Figure 5 is a detail sectional view taken on the line 5—5 of Figure 4;

Figure 6 is a fragmentary view in bottom plan of the planter unit;

Figure 7 is a fragmentary view in top plan on a somewhat enlarged scale of a portion of the seed wheel, showing particularly the details of the seed cells; and Figure 8 is a fragmentary vertical sectional view through the center of the seed cells of that portion of the seed wheel shown in Figure 7.

Figure 1:
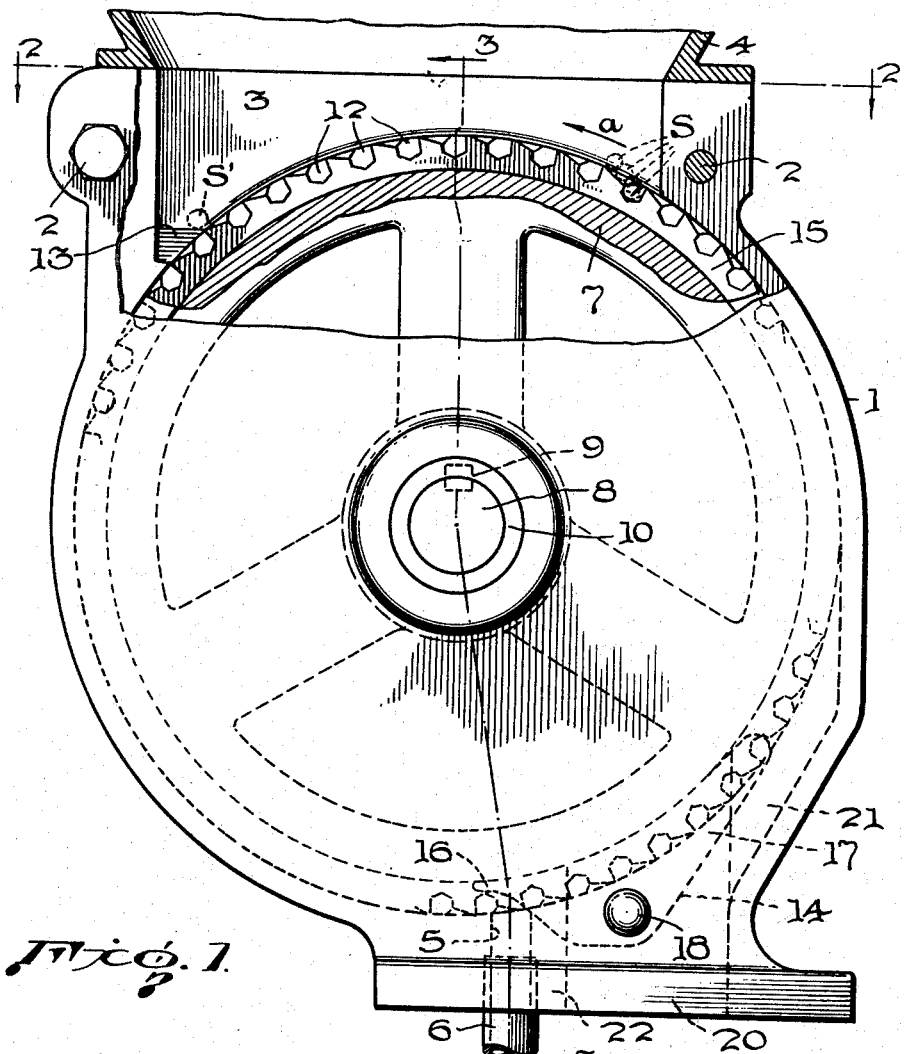
Figure 1 is a view in side elevation of a seed planter unit constructed in accordance with my invention, certain parts thereof being broken away and shown in section.

Like reference characters designate corresponding parts in the several figures of the drawings, in which the seed planter is shown in the form of a unitary assembly adapted to be mounted individually on a furrower (not shown) relatively close to the ground, and driven individually from any suitable moving part, such as a rotating part of the machine with which the planter unit is associated. It is to be understood, however, that this arrangement of the planter units is not essential to the present invention, and, therefore, is not intended as a limitation of the invention as defined in the claims appended hereto, even though in most cases it may be preferable to individually mount the planter units on the respective furrowers so that each planter unit is free to move up and down with its furrower independently of other units. The seeds to be planted by such units are preferably graded to a very close size range before introducing the same into the planter for planting a row, but here again, the uniformity of grading the seed is not absolutely essential.

Referring to the drawings, it will be seen that the planter unit includes a housing generally designated 1, one side of which, such as is designated at 1', is removably attached by means of bolts 2, 2, for convenience of assembly of the parts. The upper side of the housing is open to provide a seed inlet 3 which is in communication at its upper end with the lower end of a hopper generally designated 4, the latter being suitably mounted upon the housing 1. At the bottom of the housing, the housing is provided with a seed outlet, as indicated at 5, said outlet being preferably equipped with a seed discharge tube 6 which is adapted to lead from the outlet port 5 to a point near the ground so as to maintain accurate distribution of the seed in the planted row.

The uniformity of seed distribution in the planted row is attained by a seed wheel generally designated 7, of improved design, said seed wheel being keyed or otherwise suitably fixed to a driven shaft 8 which is rotatably mounted in the housing 1. While the parts of the planter unit may be made of any suitable materials, I prefer to construct the housing 1 of cast iron and the seed wheel of brass, the seed wheel being keyed by the key 9 to shaft 8, the latter being preferably composed of stainless steel. To dispense with the necessity of lubrication, graphite impregnated bronze bushings 10, 10 may be utilized, these bushings 10 being mounted in hubs 11, 11 respectively extending laterally from the opposite sides of the housing 1. This construction as just described readily lends itself to precision fits of the parts, and thus provides a unit requiring no lubrication and one which will not be seriously affected by prolonged exposure to the weather, dirt, dust, and the like.

The seed wheel is provided at its periphery with a series of seed cells or pockets respectively designated 12, said cells being arranged in one or more rows at equally spaced intervals about the seed wheel. According to the arrangement illustrated in the drawings, only one row of seed cells is shown, but it is to be understood that where more than one row is desired, any suitable number of rows may be employed within practical limits. Likewise, the spacing of the seed cells may be varied to suit the particular conditions, according to the nature of the seeds to be planted.

As best shown in Figures 7 and 8, each seed cell consists of a cell proper, designated 12', of suitable depth, the leading edge of which is relieved, as indicated at 12'', thereby giving the cell a somewhat elongated form. The relieved side of the cell is of progressively increasing depth in the direction of advancement of the cell by rotation of the seed wheel in the direction shown by the arrows $a$ in the various figures of the drawings. The opposite side of each cell terminates in an abrupt wall 12''' which extends radially inwardly from the outer periphery of the seed wheel, or substantially so, and the bottom of the cell proper is preferably V-shaped in cross section or conical, as indicated at 12'''', the purpose of the latter being to centralize the seed when it is deposited in the cell, and otherwise contribute to the ejection of the seed as will be hereinafter more fully described.

Figure 2:
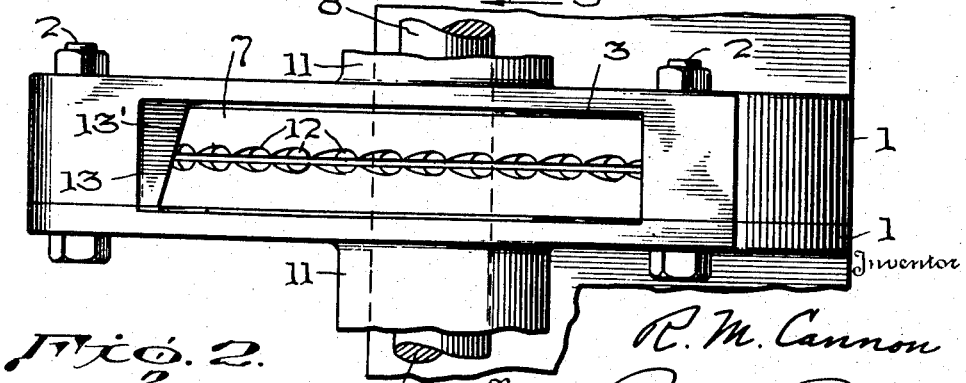
Figure 2 is a top plan view of that portion of the planter unit which lies below the hopper, and thus corresponding to a horizontal sectional view taken on the line 2—2 of Figure 1.

By relieving the leading side of the cell as just described, the filling of the cell with a relatively high peripheral speed of the seed wheel is materially facilitated, because the relief allows the seed to start dropping into the cell well in advance of the cell proper, as progressively represented in dotted lines at S in Figure 1 of the drawings. Thus, the seed has the full length of the seed cell from the extreme leading end of the relief groove 12'' to the rear wall 12''' at the back end of the cell, in which to drop into the cell proper and be caught by the back wall 12''' of the cell, following which the seed will be carried around with the seed wheel from the intake side of the planter unit to the discharge side. As the seeds are advanced by the seed wheel after dropping into the respective seed cells, any seeds lying above those in the seed cells, as generally represented by the dotted lines designated S', will be effectively cut off by the cut-off plate or ledge 13 provided within the housing 1, so that from the point of cut-off to the seed discharge port 5 at the bottom of the housing only those seeds lying in the cells 12 will be advanced by rotation of the seed wheel. The inner edge of the cut-off 13 preferably lies at an angle to the center line of the seed wheel, as indicated at 13' in Figure 2 of the drawings, this edge being formed with sufficient clearance with respect to the seed wheel.

As the seed cells 12 successively advance in the direction of the arrows $a$ toward the discharge port 5 communicating with the discharge tube 6, the seed will either fall out of the seed cells by the action of gravity, or they may be positively ejected by means now to be described, said ejecting means being preferably provided to insure ejection of the seeds always at precisely the same point of advancement of the seed by the seed wheel. The ejecting means just referred to includes a knockout member generally designated 14, this knockout member being in the form of a relatively thin blade or finger, the inner edge of which is arcuate and projects into a peripheral groove 15 formed in the seed wheel in the central plane of the seed cells 12. This peripheral groove 15 is of somewhat greater depth than the depth of the deepest part of the seed cells 12, as clearly shown in the drawings, and in the normal operation the arcuate inner edge of the knockout blade engages and rides easily upon the base of the groove, as best shown in Figure 4 of the drawings. One end of the knockout blade 14 is extended at 16 into the form of a seed ejecting nose having a depth at its extreme end which is somewhat less than the distance between the base of the peripheral groove 15 and the bottom of the seed cells 12, so that, as the seed cells approach the nose 16, the nose will initially clear the seed without engagement therewith until the seed wheel has advanced to a more or less greater extent. From the nose 16, the knockout blade is smoothly and gradually tapered outwardly respecting the seed wheel, so that at the precise point of ejection of the seed, the knockout blade will eject the seed without injuring or damaging the seed, as would otherwise occur if the knockout blade were interposed in the path of the movement of the seed at a more abrupt angle.

The knockout blade 14 is preferably pivotally mounted in the housing 1 so as to be entirely free to rock about its pivotal axis, and the end of the knockout blade opposite to the nose 16 is extended so as to provide a counterweight tail 17. For convenience of assembly and to permit easy and quick removal and replacement of the knockout blade 14, it is preferably mounted upon a pin 18 which extends through the same and through the opposite sides of the housing 1 at one side of the seed wheel 7. The knockout blade is preferably free to rock on the pin, and the pin may be normally restrained against displacement in any suitable manner, as by means of a cotter key 19. On removal of the cotter key, the pin may be axially displaced until free of engagement with the knockout blade, whereupon the knockout blade may be removed from the housing 1 through an opening 20 formed in the bottom of the housing. This opening 20 is of such shape as to afford convenient access to the knockout blade, but is so designed as to prevent the knockout blade from being mounted in the housing in a reversed position. To this end, the opening 20 merges with an outwardly and upwardly tapered space 21 in the lower part of the housing 1 at one side of the opening, and at the other side of the opening 20, the opening narrows in width, as at 22, to a width only slightly greater than the width of the knockout blade 14, this latter narrowed portion of the opening 22 receiving the seed ejecting portion of the knockout blade.

Under normal conditions, the arcuate inner edge of the knockout blade 14 engages with the base of the peripheral groove 15 for the full length of the knockout blade, and the knockout blade is free to float both laterally and pivotally on the pin 18. However, should the groove 15 be accidentally cut too deep, or should become deepened by wear over a long period of use, the counterweight action of the tail 17 of the knockout blade will automatically cause the knockout blade to rock on the pin 18 in a clockwise direction, as viewed in Figures 1 and 4, so that the nose 16 will always bear upon the base of the groove 15, and thus assume the normal seed ejecting position which insures accurate ejection of the seed at the same point in the rotative advancement of the seed wheel, and with the very minimum of injury to the seeds.

While the specific details of construction have been herein shown and described, the invention is not confined thereto as changes and alterations may be made without departing from the spirit thereof as defined by the appended claims.

I claim:

1. A seed planter of the class described, comprising a housing having a seed inlet and a seed outlet, a seed wheel rotatably mounted in the housing, said seed wheel having a series of peripheral seed cells or pockets therein, and a peripheral groove in the plane of the cells of greater depth than the depth of the cells, a knockout member having the form of an elongated relatively thin blade terminating at one end in a tapered seed ejecting part and at the other end in a counterweight tail, and a pin removably extended transversely through the housing and the knockout member for pivotally mounting said knockout member in the housing so that its tapered seed ejecting part is normally urged by the weight of the counterweight tail aforesaid towards the base of the groove in the seed wheel, said housing being provided with an opening at its lower end through which the knockout member is displaceable on displacement of the pin, said latter opening in the housing being restricted at one end to a size accommodating the seed ejecting part of the knockout member but not the tail of the latter, so as to permit mounting of the knockout member in operative position relative to the seed wheel while preventing mounting of the knockout member in a reversed position.

2. A seed discharge mechanism, comprising a housing having a seed inlet and a seed outlet, a seed wheel rotatably mounted in said housing, said seed wheel having a series of peripheral seed cells or pockets and being provided with a peripheral groove in the plane of the seed cells, said groove being of greater depth than the cells and each of said cells being relieved at its leading side from a point substantially in advance of and progressively increasing in depth towards the cell proper, the rear wall of each cell lying substantially radially of the seed wheel, and a seed knockout disposed adjacent to the seed outlet for ejecting the seeds from the cells, said knockout comprising a counterbalanced blade member pivotally mounted in the housing and projecting into the peripheral groove aforesaid beyond the bottom of the cells substantially the full length of the blade member.

ROWLAND M. CANNON.

REFERENCES CITED

The following references are of record in the file of this patent:

UNITED STATES PATENTS

| Number | Name | Date |
| --- | --- | --- |
| 9,439 | Colver | Dec. 7, 1852 |
| 200,286 | Harbin | Feb. 12, 1876 |
| 1,452,912 | Hartenstein | Apr. 24, 1923 |
| 1,997,791 | Hoberg et al. | Apr. 16, 1935 |

FOREIGN PATENTS

| Number | Country | Date |
| --- | --- | --- |
| 18,381 | Great Britain | Aug. 24, 1904 |
| 23,611 | Great Britain | Dec. 5, 1914 |
| 311,755 | Germany | May 7, 1918 |
| 363,342 | Italy | Oct. 3, 1938 |